Sept. 4, 1962    G. D. HAYBALL ETAL    3,052,861

BOLOMETER

Filed Dec. 22, 1959

INVENTORS.
GEORGE D. HAYBALL,
EUGENE W. PETERSON,
THOMAS H. JOHNSON.
BY John M. Koch

ATTORNEY 3,052,861
BOLOMETER
George D. Hayball, Innsbruck, Austria, and Eugene W. Peterson and Thomas H. Johnson, Santa Barbara, Calif., assignors to Santa Barbara Research Center, Goleta, Calif., a corporation of California
Filed Dec. 22, 1959, Ser. No. 862,442
3 Claims. (Cl. 338—18)

This invention relates to a radiation detector device, and more particularly to an infrared radiation detector cell.

The various practical applications of infrared sensing devices determines to a large extent the desired characteristics of the detector cells employed in each case. The three parameters which to a major degree determine the characteristics of an infrared detector are the minimum detectable energy, the spectral response and the time constant. It is apparent that a detector which will respond to certain very low amounts of infrared radiation will be of greater practical value than a detector which cannot produce a signal equal in magnitude to the noise of the cell when receiving this certain very low amount of radiation. A detector in a missile, for example, must react to relatively low temperature energy, such as that produced by exhaust gases from a jet engine.

At the same time, the detector must discriminate against background radiation, such as is present in sunlight. Such background radiation, which is strongest in the shorter wavelength region, is generally filtered out so that it does not reach the detector. The practical value of a detector thus depends largely upon the efficiency with which the longer wavelength infrared radiation can be detected after the shorter wavelength background radiation has been filtered out, that is, the spectral response or sensitivity over the longer infrared wavelength range of the detector. Since objects at ordinary ambient temperatures, including the detector itself, radiate energy in this wavelength range, it is necessary that detectors of maximum sensitivity be refrigerated. This invention pertains to the means of cooling radiation detectors.

The detector support material should have high thermal conductivity to quickly attain minimum temperature and to maintain such temperature against any heat loads that may be applied through radiation, gas conduction, or electrical currents, and should also have the properties of an electrical insulator so that electrodes may be directly attached. In addition, the detector should be appropriately designed and constructed for convenient and secure attachment thereto of a suitable radiation shield capable of precise alignment and preferably permitting the use of soldered joints for secure attachment. The seals employed in the detector structure should by all means be entirely reliable at low temperatures as well as at ambient temperatures.

Accordingly, it is an important object of this invention to provide a radiation detector of improved construction from which the disadvantages and defects of prior art detectors described above have been eliminated.

Another object of the invention is to provide an infrared radiation detector having improved sensitivity and spectral response and a shorter cool down time.

A further object is to provide such a detector which is made of rugged and durable construction and is adapted for convenient and precise radiation shielding.

Briefly stated in general terms, the objects of the invention are attained by providing a radiation detector cell comprising a hollow member, such as a glass tube, a sapphire support member such as a synthetic sapphire disk mounted on the hollow member to form a portion of the wall thereof, preferably an upper end wall perpendicular to the axis of a tubular member, and a radiation sensitive material mounted or deposited on the sapphire support member for detecting radiation. A set of suitable electrodes is connected to the radiation sensitive material by the use of indium solder and the electrodes are connected to appropriate circuitry for amplifying and evaluating the cell signal. An opening is provided in the hollow member, such as a lower open end of a glass tube, for the introduction therein of a coolant to cool and maintain the radiation sensitive material at a desired low reference temperature. A thermal insulating envelope member is mounted around the hollow member and sapphire disk assembly to insulate the same from ambient temperatures. This insulating envelope preferably is a vacuum jacket and is provided with a viewing or window means opposite the radiation sensitive material for transmission of radiation to the sensitive material.

Additional objects will become apparent from the following description of a specific embodiment of the invention which is given primarily for purposes of illustration and not limitation. This description is given with reference to the appended drawing, wherein.

In the specific embodiment shown in FIGS. 1 to 4, the hollow member 10 is a glass tube made of suitable glass, such as Corning Glass 7520, for sealing directly to the artificial sapphire 11. (Alternatively, a desired glass tube 10 can be selected and connected to the sapphire disk 11 by an intermediate graded seal of one or more glasses between the tube 10 and the disk 11, as indicated at 12 and 13 in FIG. 4. In this manner, the disk 11 can be sealed to a desired glass tube 10 with the aid of a glass seal of expansion coefficient similar to that of the sapphire disk 11.)

In any event, the end of the glass tube 10 is ground with fine carborundum and polished with rouge to prevent the formation of air bubbles in the seal. The end of the polished tube 10 and the sapphire disk 11 are heated to a high temperature, such as about 800° to about 900° C., so that the glass softens and wets the hot sapphire disk. At that point the end of the tube is brought in contact with the disk. The resulting seal is blown out, if necessary, to even out any congealed section. Next, it is removed to an oven and annealed at about 470° to about 560° C. in a furnace for about 10 minutes. The seal then is cooled gradually, such as at a rate of about 3° C. per minute, to avoid sudden temperature drops.

Figure 1:
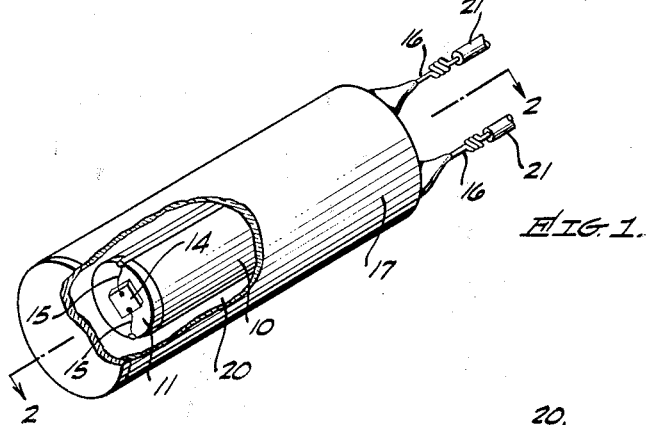
FIG. 1 is an isometric view, with portions broken away, showing an assembled infrared detector cell.
Figure 2:
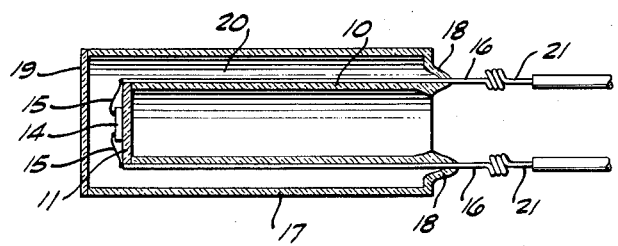
FIG. 2 is a sectional elevational view taken along the line 2—2 of FIG. 1.
Figure 4:
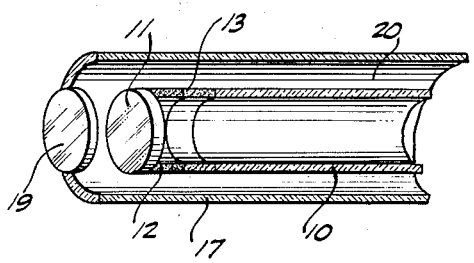
FIG. 4 is a partial elevational view with portions broken away, showing details of the construction of the detector cell support.

The glass tube 10 with the attached sapphire end wall 11, attached infrared detector cell 14, and connecting leads 15 and electrodes 16 is sealed directly, or through a suitable graded glass seal 12, 13, to a suitable glass envelope 17, such as one made of Pyrex 7740. The technique used for this operation, including the formation of gas-tight metal-to-glass seals 18, is well-known in the glass-blowing art. The end of the envelope 17 adjacent the detector cell 14 also is provided with a sapphire disk 19, preferably before tube 10 is sealed thereto. This operation is carried out in a manner similar to that described above in connection with sealing sapphire disk 11 to glass tube 10, including the use of intermediate graded seals and annealing procedure. Before sealing off the annular space 20, between the tube 10 and the envelope 17, the space 20 is evacuated to thermally insulate the cell 14 from the surrounding atmosphere. The procedure for accomplishing this step also is conventional practice in the art. The completed cell package is electrically connected into a suitable detector circuit (not shown) by insulated connecting conductors 21 as best shown in FIGS. 1 and 2.

Figure 3:
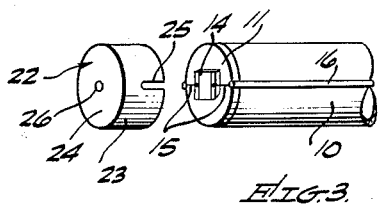
FIG. 3 is a partial exploded view of the cell showing the use of a radiation shield and contacts between the electrodes and the infrared sensitive material of the cell.

The sensitivity of detector cell 14 generally is increased by shielding it from infrared radiation originating from the surroundings of the cell and not originating from the optical field of view, which field includes the signal radiation. A cup-shaped opaque shield 22 is shown in FIG. 3 for use with the cell 14. The shield is provided with a cylindrical side portion 23 and an integral circular cover portion 24. The inside diameter of the shield is made slightly larger than the outside diameter of disk 11 and tube 10 so that the shield can be fitted snugly over the cell 14, disk 11 and the end of tube 10. To accomplish this purpose, the side portion 23 of the shield is provided with two diametrically aligned slits 25 dimensioned to snugly accommodate the ends of electrodes 16 when the shield is fitted over the end of tube 10. A central aperture 26 is formed through cover 24 to admit radiation originating from the optical field of view, including the signal radiation, to the detector cell 14.

Among the advantages observed in the infrared detector cell described hereinabove are a very short cool down time due to very rapid heat transfer through the sapphire disk supporting the detector cell. Only about 2 to about 20 seconds are needed for small cells to cool. Sapphire disks are readily obtained with flat surfaces where the area of contact of the flat sapphire surface with the device to be cooled is maximized. Metal heat shields can be clamped or soldered with indium directly to the overhang of the sapphire disk without breakage due to large differences of thermal contraction found in cooling supports of glass at the very low cooling temperatures employed. A most important advantage accrues to the use of this invention in that no insulators or standoff lead holders are required. This is due to the fact that the sapphire serves not only as a heat conductor but also as an electrical insulator. Wires may be attached directly to the sapphire detector cell support where they are cooled to prevent heat loss through such wires which are connected to ambient temperature portions of the cell package.

Figure 5:
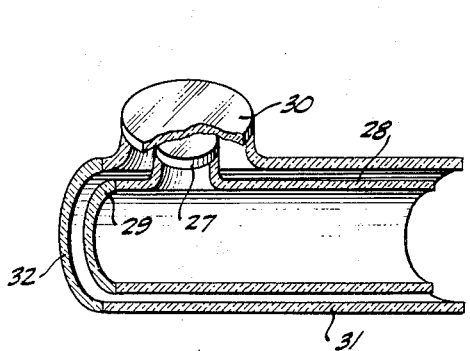
FIG. 5 is a sectional similar view showing another specific embodiment of the invention.

As shown in FIG. 5, the sapphire detector cell support 27 can be sealed into the side of a glass tube 28 instead of into the end thereof. In such case, the end of the glass tube 28 is sealed off by a glass wall 29. A detector cell (not shown) is mounted on the support 27 in the same manner as described above in connection with the description of the embodiment of FIGS. 1 to 4. Leads and electrodes also are connected to the detector cell as described above. A sapphire disk 30 is mounted in the side of glass envelope 31 adjacent support 27 and in alignment therewith. The end of the envelope is sealed off at 32 by a glass wall. The procedure used for attaching sapphire disks 27 and 30 is similar to that described above, and the fabrication of the cell package also is similar to that described above.

In the embodiments described above, the interior of glass tube 10 or 28 is cooled, during the operation of the cell 14, by a suitable refrigerant, such as a liquefied gas, for example, by the use of a suitable cryostat (not shown).

It will be understood that the use of a sapphire detector support for a cell mounted on the inside of the support disk, such as inside disk 11 or inside disk 27, also is contemplated within the scope of this invention. In such case, the refrigerant is used on the outside of tube 10 or outside tube 28 to cool the detector cell and also insulate the cell from its surroundings.

It will be apparent that many modifications and variations of the present invention can be made in the light of the teachings given hereinabove without departure from the spirit and scope of the invention. It is therefore to be understood that within the scope of the appended claims, the invention can be practiced otherwise than as described hereinabove.

What is claimed is:

1. An infrared detector package comprising a hollow glass member, a sapphire support member mounted on the hollow glass member to form a portion of the wall thereof, an infrared detector cell mounted on the sapphire support member, a pair of electrode means connected in spaced relationship to the infrared detector cell and attached to the sapphire support member, an opening in the hollow member for the introduction therein of a refrigerant to cool the infrared detector cell, a thermal insulating glass envelope member mounted around the hollow member, and a sapphire viewing member in the envelope member opposite the infrared detector cell for transmission of infrared radiation to said cell.

2. An infrared detector package comprising a glass tubular member, a sapphire support disk mounted on the tubular member to form a portion of the wall thereof, an infrared cell mounted on the sapphire support disk, a pair of conductors connected in spaced relationship to the infrared detector cell and attached to the sapphire support disk, an opening in the tubular member for the introduction therein of a refrigerant to cool the infrared detector cell, a glass envelope member mounted around the tubular member, and a sapphire disk mounted in the envelope member opposite the infrared detector cell for transmission of infrared radiation to said cell.

3. An infrared detector package comprising a glass tubular member, a sapphire support disk mounted on the tubular member to form a portion of the wall thereof, an infrared cell mounted on the sapphire support disk, a pair of conductors connected in spaced relationship to the infrared detector cell and attached to the sapphire support disk, an opening in the tubular member for the introduction therein of a refrigerant to cool the infrared detector cell, a shield of opaque material mounted over the infrared detector cell for shielding said cell from radiation originating from the surroundings thereof, an aperture in said shield for transmitting infrared radiation originating from a field of view, a glass envelope member mounted around the tubular member, and a sapphire disk mounted in the envelope member opposite the infrared detector cell for transmission of infrared radiation to said cell.

References Cited in the file of this patent

UNITED STATES PATENTS

| | | |
|---|---|---|
| 2,875,308 | Tarbes | Feb. 24, 1959 |
| 2,884,345 | Rocard et al. | Apr. 28, 1959 |
| 2,892,250 | Bartels | June 30, 1959 |
| 2,951,944 | Fong | Sept. 6, 1960 |